United States Patent [19]

Fukuchi et al.

[11] 4,337,154
[45] Jun. 29, 1982

[54] CROSSLINKED COMPOSITE SEMIPERMEABLE MEMBRANE

[75] Inventors: Shuzo Fukuchi; Tetsuzo Hayashi, both of Osaka; Hiroya Kobayashi, Minoo; Ryoichi Oshiumi, Ibaraki, all of Japan

[73] Assignee: Nippon Shokubai Kagaku Kogyo Co., Ltd., Osaka, Japan

[21] Appl. No.: 136,245

[22] Filed: Apr. 1, 1980

[30] Foreign Application Priority Data

Apr. 4, 1979 [JP] Japan ................................ 54-39881
Apr. 6, 1979 [JP] Japan ................................ 54-41124
Apr. 10, 1979 [JP] Japan ................................ 54-42484

[51] Int. Cl.³ ............................................. B01D 39/16
[52] U.S. Cl. ................................. 210/490; 210/500.2; 210/506
[58] Field of Search .................... 210/653, 654, 500.1, 210/500.2, 506, 490; 55/158; 521/27; 429/249, 250, 253, 254; 204/296; 428/315, 411, 420

[56] References Cited

U.S. PATENT DOCUMENTS

| 3,687,842 | 8/1972 | Credali et al. | 210/654 |
| 3,696,031 | 10/1972 | Credali et al. | 210/654 |
| 3,744,642 | 7/1973 | Scala et al. | 210/500.2 |
| 3,951,815 | 4/1976 | Wrasidlo | 210/500.2 |
| 4,039,440 | 8/1977 | Cadotte | 210/654 |
| 4,082,659 | 4/1978 | Heinze et al. | 210/636 |

FOREIGN PATENT DOCUMENTS 51-13388 2/1976 Japan ................................ 210/653

OTHER PUBLICATIONS

"Continued Eval. of In Situ-Formed Condensation Polymers for R.O. Membranes" Midwest Research Institute, Apr. 1976, NTIS-PB-253, 193, pp. 16-20, 31.
Cadotte J. E., et al., "In-Situ-Formed Condensation Polymers for Reverse Osmosis Membranes" Office of Saline Water, 1972, NTIS-PB-229, 337, p. 1.
Fans H. H. P., et al., "Removal of Alcohols, Amines, and Anphatic Acids in Aqueous Solution by NS-100 Membranes" Jour. App. Pol. Sc., vol. 19, pp. 1347-1358 (1975).

Primary Examiner—Ernest G. Therkorn
Assistant Examiner—David R. Sadowski
Attorney, Agent, or Firm—Sherman & Shalloway

[57] ABSTRACT

A composite semipermeable membrane comprising a porous support and a crosslinked thin film formed on said porous support, said crosslinked thin film being formed by reacting compound (A) which is at least one compound selected from the group consisting of polyalkylenimines and polyalkylenimine derivatives, compound (B) which is at least one compound selected from a group of compounds typified by piperazine, 2,5-dimethylpiperazine, 4-aminomethylpiperidine and 1,4,8,11-tetraazacyclotetradecane, and compound (C) as a crosslinking agent which is a compound having in one molecule two or more functional groups capable of reacting with amino groups; and a process for preparing said composite semipermeable membrane.

7 Claims, No Drawings

CROSSLINKED COMPOSITE SEMIPERMEABLE MEMBRANE

This invention relates to a composite semipermeable membrane and a process for preparing the same.

In recent years, separating methods using membranes have been employed widely. Among them, reverse osmosis and ultrafiltration have found steady expanding use and a brilliant future is anticipated therefor. Reverse osmosis does not involve a phase change and costs little energy as compared with other separating techniques, and moreover, can easily separate a low molecular weight solute, and thus, is finding wide applications not only in the separation of inorganic solute as in the desalination of brackish water or seawater, but also in waste water treatment in a variety of fields such as the foodstuff industry, municipal sewage, plating industry or pulp industry.

Hitherto known reverse osmosis membranes are typified by a cellulose acetate membrane and aromatic polyamide membranes. These reverse osmosis membranes are asymmetric membranes that are usually fabricated from the so-called casting solution prepared by dissolving membrane materials in solvents. The asymmetric membrane comprises a porous supporting layer and a dense layer which are made of the same polymer. Therefore, it has been very difficult for such method to produce a membrane having good performance, especially, a membrane having a high flux considered vital to the lowering of costs for separation by reverse osmosis, though extensive studies have so far been made on the type of the polymer, the type of solvent for the polymer, the membrane-forming conditions, the way of post-treating the resulting membrane, and so forth.

As an alleviator of the above-described drawback facing asymmetric membranes, composite membranes have drawn attention in recent years. The composite membrane comprises a solute-rejecting dense layer placed on a porous support that has been prepared beforehand, and the materials for the porous support and the dense layer can be arbitrarily selected and combined. The composite membranes are produced, for example, by the following known methods:

Method of preparing a composite membrane which comprises the interfacial polycondensation of a polyamine, attached onto a porous support such as a cellulose ester, with the use of a crosslinking agent (U.S. Pat. No. 3,744,642);

Process for preparing a reverse osmosis membrane which consists of the interfacial polycondensation of a polyethylenimine film, coated on a porous support such as polysulfone, with a polyfunctional crosslinking agent such as isophthaloyl chloride (U.S. Pat. No. 4,039,440); and Process for preparing a reverse osmosis membrane, comprising the interfacial polycondensation of an acrylonitrile- or epichlorohydrin-grafted polyethylenimine with a crosslinking agent such as isophthaloyl chloride (U.S. Pat. No. 3,951,815).

Generally, the performance of a reverse osmosis membrane is expressed by the two values—a flux representing the amount of water that permeates a unit area of the membrane in a unit time, and a rejection (solute rejection) representing the degree to which the permeation of a solute through the membrane can be inhibited. The performance of the reverse osmosis membrane is governed by the membrane material, and the flux and the rejection are balanced in that performance. In other words, when the membrane-fabrication conditions are varied to increase the flux of the membrane, its rejection decreases; when the rejection is increased, on the other hand, the flux decreases.

In order for reverse osmosis to be used henceforth widely as a separating technique, further reduction in the cost of separation involved is desired. To realize the cost reduction, it is desired to develop a semipermeable membrane having a high flux and a high rejection. However, the hitherto known membrane materials have failed to afford semipermeable membranes having high performance which satisfies both the flux and rejection required. In addition, semipermeable membranes produced from a great many membrane materials that had been known so far have suffered from various drawbacks such as biological degradation, deterioration by chlorine or oxidizing agents, and flux decline due to compaction.

As aforementioned, U.S. Pat. Nos. 4,039,440 and 3,951,815, for example, made known semipermeable membranes comprising polyethylenimine or polyethylenimine derivatives. They both are insufficient for practical use. The semipermeable membrane comprising a crosslinked film of polyethylenimine alone has a low flux and a poor chlorine resistance, while the semipermeable membrane comprising a grafted polyethylenimine for enhanced resistance to chlorine has a lower flux.

Semipermeable membranes fabricated from polymers having a piperazine ring are made known by U.S. Pat. Nos. 3,696,031 and 3,687,842, for instance. These membranes, however, have an extremely low flux or a very low rejection.

Therefore, an object of the present invention is to provide a high-performance composite semipermeable membrane having a high rejection and, nevertheless, a high flux and further possessing a good resistance to chlorine.

Another object of the present invention is to provide a process for preparing such a composite semipermeable membrane with good reproducibility on a commercial scale.

According to the present invention, there are afforded composite semipermeable membranes attaining the above-mentioned objects, namely, a composite semipermeable membrane having on a porous support a crosslinked thin film formed by reacting compound (A), compound (B) and compound (C) to be described below, and a composite semipermeable membrane having on a porous support a crosslinked thin film formed by reaction of said compounds (A), (B) and (C) and having a water-soluble organic polymer protective coating layer on the surface of said crosslinked film.

According to the present invention, there are also provided processes for preparing said composite semipermeable membranes attaining the aforementioned objects, namely, a process which comprises forming a film comprising said compounds (A) and (B) on a porous support, treating the resulting film with a solution of said compound (C), and then drying the film to form a crosslinked thin film comprising the reaction product of said compounds (A), (B) and (C); and a process which comprises forming a film comprising said compounds (A) and (B) on a porous support, contacting the film with a solution of said compound (C), then drying the contacted film to form a crosslinked thin film composed of the reaction product of said compounds (A), (B) and (C), and further coating said crosslinked thin film with an aqueous solution of a water-soluble organic polymer to form a protective coating layer on the surface of said crosslinked thin film.

Compound (A):

At least one compound selected from the group consisting of polyalkylenimines and polyalkylenimine derivates.

Compound (B):

At least one compound selected from the group consisting of:

compound (B₁) of the general formula

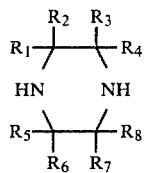

wherein $R_1$ to $R_8$ each represent a hydrogen atom or an alkyl group having 1 to 4 carbon atoms, compound (B₂) of the general formula

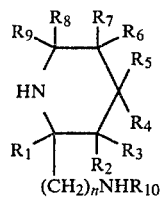

wherein $R_1$ to $R_{10}$ each represent a hydrogen atom or an alkyl group having 1 to 4 carbon atoms, and n denotes an integer of 1 to 3, compound (B₃) of the general formula

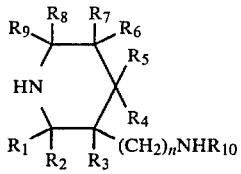

wherein $R_1$ to $T_{10}$ each represent a hydrogen atom or an alkyl group having 1 to 4 carbon atoms, and n denotes an integer of 1 to 3, compound (B₄) of the general formula

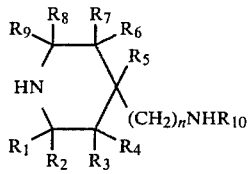

wherein $R_1$ to $R_{10}$ each represent a hydrogen atom or an alkyl group having 1 to 4 carbon atoms, and n denotes an integer of 1 to 3, and compound (B₅) [excluding compound (A)] of the general formula

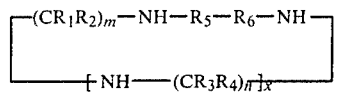

wherein $R_1$ to $R_4$ each represent a hydrogen atom or an alkyl group having 1 to 4 carbon atoms; m and n each represent an integer of 2 or 3; x denotes an integer of 1 to 4; $R_5$ and $R_6$ each represent an alkylene group having 1 to 4 carbon atoms; and in some cases, $R_5$ and $R_6$ may each represent a hydrogen atom or an alkyl group having 1 to 4 carbon atoms without being bonded to each other.

Compound (C):

Compound having in one molecule two or more functional groups capable of reacting with amino groups (polyfunctional crosslinking agent).

The reasons why the composite semipermeable membrane obtained by the present invention possesses a high flux while maintaining a high rejection have not been made clear to date. Nor was such combination of high flux and high rejection anticipated from prior arts.

The porous support for use in the present invention may be those known to people skilled in the art. Examples include cellulose esters such as cellulose acetate or cellulose nitrate, polymers such as polyvinyl chloride, polycarbonate, polysulfone, polyacrylonitrile, polyester, or polystyrene, and mixtures of these polymers. Of them, polysulfone, polycarbonate and polyvinyl chloride are preferred for the present invention. The porous support is used in the form of said polymer alone, but it is also used suitably in the form reinforced with a woven fabric or a nonwoven fabric. The preparation of these porous supports is well known in the art. The pores opening to the surface of the support are not restricted in pore diameter, but preferably, most of the pores have pore diameters of not more than 5000 Å. For a particularly high rejection, however, it is desirable that the diameters of the pores range from about 20 to 1000 Å. Further, the porous support may be a flat sheet as employed in a plate and frame type or a spiral-wound type, but can also be in the form of a tube or a hollow fiber.

The porous support, e.g. polysulfone support, is produced, for example, by dissolving polysulfone (e.g. "P-3500," a product of Union Carbide Corporation, U.S.A.) in an organic polar solvent such as dimethylformamide, with or without other additives such as inorganic salts or poor solvents for polysulfone, casting the resulting solution in a film of a certain thickness on a glass plate, and then dipping the resulting film in water. Generally, the so formed film has small pores on its surface in contact with air (called the face of the film) and has large pores on the surface touching the glass plate (called the back of the film). Of course, the porous support for use in the present invention is not restricted to the foregoing examples.

The compound (A) used in the present invention is at least one compound selected from the group consisting of polyalkylenimines and polyalkylenimine derivatives. The polyalkylenimine is a homopolymer or copolymer comprising at least one alkylenimine monomer. The alkylenimines refer to 1,2-alkylenimines (aziridines) and 1,3-alkylenimines (azetidines). Specific examples include ethylenimine, 1,2-propylenimine, 1,3-propylenimine, 2,2-dimethylaziridine, 2-ethylaziridine, 2-n-propylaziridine, 2-isopropylaziridine, 2-n-butylaziridine, 2-isobutylaziridine, and 1-(2-aminoethyl)aziridine. 1-methylaziridine, 1-ethylaziridine, 1-(2-cyanoethyl)aziridine and 1-(2-hydroxyethyl)aziridine may be used as a copolymer component. Homopolymerization or copolymerization of the alkylenimine monomer to a polyalkylenimine is promoted by an acid catalyst and is easily performed by a method known in the art. The copolymerization of the alkylenimine monomer may be random copolymerization, block copolymerization or graft copolymerization. The typical polyalkylenimines are polyethylenimine and polypropylenimine. They are being manufactured on a commercial scale, and marketed articles can be used unchanged. The molecular weight of the polyalkylenimine is not critical, and usually, it is in the wide range of from about 600 to about 1,000,000, the particularly preferred range being about 1000 to about 100,000.

The polyalkylenimine derivatives refer to the so-called modified polyalkylenimines which have been prepared by reacting part of the amino groups of polyalkylenimines with compounds having functional groups reactive with amino groups and which have been rendered soluble in water or solvents consisting mainly of water. Specific examples of the polyalkylenimine derivatives include polyalkylenimine derivatives obtained by reacting polyalkylenimines with compounds having a reactive double bond such as acrylamide or acrylonitrile; polyalkylenimine derivatives obtained by reacting polyalkylenimines with epoxide compounds such as ethylene oxide, glycidol or epichlorohydrin; polyalkylenimine derivatives obtained by reacting polyalkylenimines with aldehydes such as formaldehyde or acetaldehyde; and polyalkylenimine derivatives obtained by reacting polyalkylenimines with acid anhydrides such as succinic anhydride. Of course, however, the polyalkylenimine derivatives are not restricted to them. The polyalkylenimine derivatives may be used singly or as mixtures of two or more. Furthermore, the polyalkylenimine derivatives may be used jointly with the polyalkylenimines.

Compound (B) used in the present invention is at least one compound selected from the group consisting of the compounds ($B_1$), ($B_2$), ($B_3$), ($B_4$) and ($B_5$) that have been expressed by the aforementioned general formulae.

Specific examples of compound ($B_1$) are piperazine; 2-methylpiperazine; dimethylpiperazines such as 2,5-dimethylpiperazine; trimethylpiperazines such as 2,3,5-trimethylpiperazine; tetramethylpiperazines such as 2,3,5,6-tetramethylpiperazines; 2-ethylpiperazine; diethylpiperazines such as 2,5-diethylpiperazine; dipropylpiperazines such as 2,5-diisopropylpiperazine; and dibutylpiperazines such as 2,5-dibutylpiperazine. These compounds are used as pure stereoisomers (cis-/trans-) as well as mixtures thereof. Mixtures of two or more of these compounds are also usable.

Specific examples of the compound ($B_2$) are 2-aminomethylpiperidine, 2-aminoethylpiperidine, and 2-aminopropylpiperidine. Mixtures of at least two of these compounds are also usable.

Typical examples of the compound ($B_3$) are 3-aminomethylpiperidine, 3-aminoethylpiperidine, 3-(2-aminopropyl)piperidine, 3-aminomethyl-2-methylpiperidine, 3-aminomethyl-2,4-dimethylpiperidine, and 3-aminomethyl-2,6-dimethylpiperidine. These compounds are also usable as mixtures of two or more.

Specific examples of compound ($B_4$) are 4-aminomethylpiperidine and 4-aminoethylpiperidine, and mixtures of these compounds are also usable.

Typical examples of compound ($B_5$) include 1,4,7-triazacyclononane, 1,4,7-triazacyclodecane, 1,4,8-triazacycloundecane, 1,5,9-triazacyclododecane, 1,4,7,10-tetraazacyclododecane, 1,4,8,11-tetraazacyclotetradecane, 1,5,9,13-tetraazacyclohexadecane, 1,4,7,10,13-pentaazacyclopentadecane, 1,5,9,13,17-pentaazacycloeicosane, 1,4,7,10,13,16-hexaazacyclooctadecane, 1,5,9,13,17,21-hexaazacyclotetraeicosane, 1,10-diamino-4,7-diazadecane, 1,14-diamino-4,8,11-triazatetradecane, 1,18-diamino-4,8,11,15-tetraazaoctadecane, 11,13-dimethyl-1,4,7,10-tetraazacyclotridecane, 12,14-dimethyl-1,4,8,11-tetraazacyclotetradecane, 5,5,7,12,12,14-hexamethyl-1,4,8,11-tetraazacyclotetradecane, and 5,5,7,12,14,14-hexamethyl-1,4,8,11-tetraazacyclotetradecane. Also, two or more of these compounds may be used jointly.

As the compound (B), there can also be used a combination of two or more compounds suitably selected from the compound ($B_1$), compound ($B_2$), compound ($B_3$), compound ($B_4$) and compound ($B_5$). Particularly preferred as compound (B) are piperazine, 2,5-dimethylpiperazine, 4-aminomethylpiperidine, and 1,4,8,11-tetraazacyclotetradecane.

In the present invention, compound (A) and compound (B) are usually used as an aqueous solution in which they are dissolved together in water or water containing alcohols such as isopropyl alcohol or solvents miscible with water, such as dioxane. In preparing an aqueous solution of compound (A) and compound (B) (hereinafter called aqueous solution (a)), the sequence of dissolving compound (A) and compound (B) is not critical. The preferred concentration of the aqueous solution (a) is such that the concentrations of compounds (A) and (B) total about 0.1% by weight to about 10% by weight. The preferred proportion of compound (A) to compound (B) used is from 1:0.05 to 1:1 in weight ratio. When compound (B) is compound ($B_1$), ($B_2$), ($B_3$) or ($B_4$), said proportion is particularly preferably in the range of from 1:0.05 to 1:0.35.

In the present invention, a film composed of compound (A) and compound (B) is formed on at least one surface of the porous support by coating the porous support with the aqueous solution (a). This film may be formed on only one surface or both surfaces of the porous support. When the film is to be formed on only one surface of the porous support, it is preferred to form the film on the face of the porous support.

The method of forming a film comprising compounds (A) and (B) on the surface of the porous support with the use of the aqueous solution (a) may be selected from a method comprising floating the porous support in the aqueous solution (a); a method comprising casting the aqueous solution (a) on the porous support; a method comprising spraying the aqueous solution (a) onto the porous support; and a method comprising immersing the porous support in the aqueous solution (a). In the method comprising floating or immersing the porous support in the aqueous solution (a), the treating time can be varied very widely in a range of from about 5 seconds to about 24 hours or longer, but such treating time is not critical. The treatment effected once is usually sufficient, but the treatment can be performed twice or more.

The porous support having on its surface a film comprising compounds (A) and (B) is directly, after drying for an arbitrary period, contacted with a solution of compound (C), thereby forming a crosslinked thin film on the porous support.

Compound (C) is a compound having in one molecule two or more functional groups capable of reacting with amino groups, and this compound acts as a polyfunctional crosslinking agent. The amino groups refer to primary amino groups or secondary amino groups (imino groups). Particularly useful as compound (C) are acid chlorides, isocyanates, thioisocyanates, sulfonyl chlorides, and chloroformates, but acid anhydrides, chlorides, activated olefins, or epoxides may also be used. Specific examples of compound (C) are acid chlorides such as oxalyl chloride, malonyl chloride, succinyl chloride, glutaryl chloride, adipyl chloride, fumaryl chloride, isophthaloyl chloride, terephthaloyl chloride, 2,6-pyridinedicarboxylic acid chloride, trimesoyl chloride, tetrahydroisophthaloyl chloride, or tetrahydroterephthaloyl chloride; isocyanates such as ethylene diisocyanate, propylene diisocyanate, hexamethylene diisocyanate, phenylene diisocyanate, tolylene diisocyanate, naphthalene diisocyanate, methylenebis(4-phenyl isocyanate), meta-xylene diisocyanate, or isophorone diisocyanate; thioisocyanates such as ethylene dithioisocyanate, propylene dithioisocyanate, phenylene dithioisocyanate, tolylene dithioisocyanate, or naphthalene dithioisocyanate; sulfonyl chlorides such as meta-benzenedisulfonyl chloride, para-benzenedisulfonyl chloride, 1,3-naphthalenedisulfonyl chloride, 1,4-naphthalenedisulfonyl chloride, or diphenyl ether disulfonyl chloride; chloroformates such as ethylene bis(chloroformate), propylene bis(chloroformate), or diethylene glycol bis(chloroformate); acid anhydrides such as pyromellitic anhydrides; chlorides such as cyanuric chloride; activated olefins such as divinyl sulfone; and epoxide such as epoxy resins (e.g. Epikote 812, a product of Shell Chemical Co.). One or more of these compounds (C) may be used.

Of such compounds (C), isophthaloyl chloride, terephthaloyl chloride and tolylene diisocyanate are particularly preferred in the present invention.

The compound (C) is usually used as an organic solution. As such an organic solvent, there is used the one which is immiscible with water and which does not dissolve the porous support. Preferred specific examples thereof are hydrocarbon solvents such as n-hexane, n-heptane, cyclohexane, or petroleum ethers. The concentration of the solution of the compound (C) is usually in the range of from about 0.05% by weight to about 10% by weight.

To enhance the reactivity of compound (C), a reaction accelerator such as diethylamine, triethylamine, dipropylamine, tripropylamine, pyridine, sodium hydroxide, sodium carbonate, sodium bicarbonate, sodium acetate or a surfactant can be added in the aqueous solution (a) or, in some cases, in the solution of compound (C).

The contacting with the solution of compound (C) of the porous support having on the surface a film comprising compounds (A) and (B) may be effected by any method which enables the film to be contacted with the solution of compound (C). For example, immersion, spraying, or roll coating is preferred. The contact time for the treatment is not critical, and an arbitrary period may be selected, but usually, the time ranges from about 10 seconds to about 30 minutes. The temperature for the treatment is also uncritical, but usually, it is preferred to perform the treatment at room temperature.

The porous support having a crosslinked thin film formed by the above-mentioned treatment with a solution of compound (C) is immediately, or after passage of an arbitrary period, subjected to drying at an elevated temperature for a certain period of time, thereby to complete the composite semipermeable membrane of the present invention. The suitable temperature for the drying ranges from about 25° C. to 130° C. The drying time is about 1 minute to 10 hours, preferably, about 5 minutes to 60 minutes. The drying can be effected by selecting any means, such as a dryer, a constant-temperature oven or an infrared lamp.

The composite semipermeable membrane obtained by the present invention in the above-described manner has excellent semipermeability and can be directly used as a reverse osmosis membrane or an ultrafiltration membrane. The composite semipermeable membrane according to the present invention need not necessarily be stored in water, and can be preserved for a long term in the dry condition, and has durability even to a dry-wet cycle. Usually, the composite semipermeable membrane is preserved in the dry condition, but in some cases, can be preserved in water or an aqueous solution of an alkali, an amine or an acid.

The composite semipermeable membrane of the present invention can be provided with a protective coating layer by coating the surface of the membrane with an aqueous solution of a water-soluble organic polymer in order to protect the membrane surface from damage during the handling of the membrane. Examples of such a water-soluble organic polymer include polymers such as polyethylenimine, polyvinyl alcohol, polyvinyl ether, polyvinylpyrrolidone, polyacrylamide, or polyacrylic acid; copolymers consisting mainly of the monomers constituting these polymers; derivatives of these polymers or copolymers; and mixtures of these compounds. Among them, polyvinyl alcohol, polyethylenimine and polyvinylpyrrolidone are particularly preferred.

The membrane coated with such an aqueous solution of the water-soluble organic polymer is preferably subjected to drying. The drying is effected suitably at a temperature of from about 30° C. to 100° C. for a time of about 5 minutes to 20 minutes.

The composite semipermeable membrane according to the present invention maintains a high rejection and a high flux for a long time, and processes good resistance to chlorine. That membrane can be applied widely not only to the desalination of brackish water or seawater, but also to the waste water treatment containing inorganic matter or organic matter.

The present invention will be described in greater detail with reference to Examples to follow, but the invention is in no way restricted to the Examples. The concentration in percent in the Examples and Comparative Examples should be understood to represent % by weight unless otherwise specified. The performances of the composite membranes in the Examples were measured by the methods described below and under the conditions indicated below with the use of a continuous reverse osmosis testing equipment.

[Testing conditions]

Feed solution: aqueous solution containing 5,000 ppm of sodium chloride
Operating temperature: 25° C.
Operating pressure: 40 kg/cm$^2$

[Water flux]

The flux 24 hours after initiation of the operation was measured by gravimetry. The unit of the flux was m$^3$/m$^2$.day.

[Rejection]

The rejection of sodium chloride was determined from measurements of the electrical conductivity of the permeate. The rejection was calculated from the following equation:

$$\text{Rejection (\%)} = \frac{\text{Concentration of feed solution} - \text{Concentration of permeate}}{\text{Concentration of feed solution}} \times 100$$

[Chlorine resistance]

An aqueous solution of 50 ppm, calculated as activated chlorine, of sodium hypochlorite was prepared. The composite membrane was dipped in the aqueous solution for 48 hours at room temperature, and then washed thoroughly with pure water. Then, the chlorine resistance of the composite membrane was evaluated.

EXAMPLE 1

A 15% dimethylformamide solution of polysulfone ("P-3500," produced by Union Carbide Corporation, U.S.A.) was cast to a thickness of 150 μm on a glass plate at room temperature, and put in water for gelling, thereby to make a porous support. The porous support is referred to hereinafter as support (I).

An aqueous solution was prepared which contained 2.5% of polyethylenimine ("Epomin P-1000," a product of Nippon Shokubai Kagaku Kogyo Co., Ltd., an average molecular weight about 70,000) as compound (A) and 0.25% of trans-2,5-dimethylpiperazine as compound (B). On the aqueous solution was floated for 1 minute the previously prepared support (I) with its face downward. Then, the support was taken out, and air-dried for 1 minute, and immersed for 1 minute in a 1% n-hexane solution of isophthaloyl chloride as compound (C). Thereafter, the support was withdrawn, drained at room temperature for 5 minutes, and dried for 10 minutes in a constant-temperature oven at 110° C., thereby to obtain a composite semipermeable membrane.

The performances of the resulting composite semipermeable membrane were a flux of 2.86 m$^3$/m$^2$.day and a rejection of 99.4%. These performances did not decline even after continuous operation for an additional 24 hours. Nor did the performance of the membrane deteriorate in the test for chlorine resistance.

EXAMPLE 2

A composite semipermeable membrane was obtained in the same way as in Example 1 except that 0.2% of 4-aminomethylpiperidine as compound (B) was used instead of 0.25% of trans-2,5-dimethylpiperazine as compound (B).

The performances of the resulting composite semipermeable membrane were measured. The flux was 2.89 m$^3$/m$^2$.day and the rejection was 99.4%. Even after continuous operation for an additional 24 hours, the lowering of those performances was not observed. In the test for chlorine resistance, the deterioration of the performance of the membrane was not observed.

EXAMPLE 3

A composite semipermeable membrane was obtained in the same way as in Example 1 except that 0.5% of 1,4,8,11-tetraazacyclotetradecane as compound (B) was used instead of 0.25% of trans-2,5-dimethylpiperazine as compound (B).

The resulting composite semipermeable membrane had a flux of 2.68 m$^3$/m$^2$.day and a rejection of 99.3%. Even after continuous operation for another 24 hours, these performances did not lower. In the test for chlorine resistance, the performance of the membrane did not deteriorate.

EXAMPLE 4

A 12% dimethylformamide solution of polysulfone was cast to a thickness of 500 μm on a tightly woven Dacron cloth having a thickness of about 100 μm placed on a glass plate. The cast layer was gelled in a water bath to make a reinforced porous support (hereinafter called support (II)).

The support (II) was dipped for 1 minute in an aqueous solution containing 2.5% of polyethylenimine as compound (A) and 0.5% of piperazine as compound (B). Then, the support was air dried for 10 seconds, and dipped for 1 minute in an n-hexane solution containing 0.75% of isophthaloyl chloride and 0.25% of terephthaloyl chloride as compound (C). After being allowed to stand for about 5 minutes at room temperature, the support was dried for 10 minutes in a constant-temperature oven at 110° C. to obtain a composite semipermeable membrane.

The performances of the resulting composite semipermeable membrane were measured. The flux was 2.58 m$^3$/m$^2$.day and the rejection was 99.1%.

EXAMPLE 5

A composite semipermeable membrane was obtained in the same way as in Example 4 except that 0.3% of 3-(2-aminopropyl)piperidine as compound (B) was used in place of 0.5% of piperazine as compound (B).

The performances of the resulting composite semipermeable membrane were measured in the same way as in Example 1. The results were a flux of 2.78 m$^3$/m$^2$.day and a rejection of 99.0%.

EXAMPLE 6

A composite semipermeable membrane was obtained in the same manner as in Example 4 except that 0.8% of 5,5,7,12,12,14-hexamethyl-1,4,8,11-tetraazacyclotetradecane as compound (B) was used in place of 0.5% of piperazine as compound (B).

The performances of the composite semipermeable membrane measured in the same way as in Example 1 were a flux of 2.49 m$^3$/m$^2$.day and a rejection of 99.1%.

EXAMPLE 7

A 15% dimethylformamide solution of polyether sulfone ("100P," a product of I.C.I.) was cast in a 200 μm thick layer on a glass plate at room temperature, and then put in water for gelling, to form a porous support (hereinafter called support (III)).

The support (III) was immersed for 5 minutes in an aqueous solution containing 3% of acrylamide-modified polyethylenimine (0.3-mol adduct) as compound (A) and 0.3% of 2,5-dimethylpiperazine (cis/trans mixture) as compound (B). Then, the support was taken out and dipped for 30 minutes in a 0.3% n-hexane solution of meta-benzenedisulfonyl chloride as compound (C). Then, the support was withdrawn, air-dried for 5 minutes at room temperature, and dried for 15 minutes in a constant-temperature oven at 90° C. to obtain a composite semipermeable membrane. The surface of the composite semipermeable membrane was coated with a 1% aqueous solution of polyethylenimine, and the coated membrane was maintained for 10 minutes in a constant-temperature oven at 80° C.

The performances of the composite semipermeable membrane having a protective coating layer on the surface were measured. The flux was 2.27 m$^3$/m$^2$.day, and the rejection was 98.8%.

EXAMPLE 8

A composite semipermeable membrane having a protective coating layer on the surface was obtained in the same way as in Example 7 except that 3% of acrylonitrile-modified polyethylenimine (0.3-mol adduct) as compound (A) and 0.3% of 3-aminomethyl-2,6-dimethylpiperidine as compound (B) was used instead of 3% of acrylamide-modified polyethylenimine (0.3-mol adduct) as compound (A) and 0.3% of 2,5-dimethylpiperazine as compound (B).

The performances of the composite semipermeable membrane having a protective coating layer on the surface were measured. The flux was 2.40 m$^3$/m$^2$.day and the rejection was 98.8%.

EXAMPLE 9

A composite semipermeable membrane having a protective coating layer on the surface was prepared in the same way as in Example 7 except that 3% of acrylonitrile-modified polyethylenimine (0.3-mol adduct) as compound (A) and 1.5% of 1,5,9,13-tetraazacyclohexadecane as compound (B) was used instead of 3% of acrylamidemodified polyethylenimine (0.3-mol adduct) as compound (A) and 0.3% of 2,5-dimethylpiperazine as compound (B).

The performances of said composite semipermeable membrane having a protective coating layer on the surface were measured. The flux was 2.68 m$^3$/m$^2$.day, and the rejection was 99.0%.

EXAMPLE 10

A composite semipermeable membrane was obtained in the same way as in Example 1 except that 2.5% of an ethylenimine/1,2-propylenimine copolymer (molar ratio of the monomers: 25/10, average molecular weight about 15,000) was used as compound (A) instead of the 2.5% of polyethylenimine. The surface of the composite semipermeable membrane was coated with a 1% aqueous solution of polyvinyl alcohol. Then, the coated membrane was maintained for 10 minutes in a constant-temperature oven at 80° C. to give a composite semipermeable membrane having a protective coating layer on the surface.

The performances of the composite semipermeable membrane having a protective coating layer on the surface were measured, with the result that the reflux was 2.67 m$^3$/m$^2$.day and the rejection was 99.2%. Even after continuous operation for an additional 24 hours, the membrane showed no declining of its performances. In the test for chlorine resistance, no deterioration was observed in the performance of the membrane.

EXAMPLE 11

A composite semipermeable membrane having a protective coating layer on the surface was obtained in the same way as in Example 10 except that 0.2% of 4-aminomethylpiperidine as compound (B) was used instead of the 0.25% of trans-2,5-dimethylpiperazine as compound (B).

Measurements of the performances of the composite semipermeable membrane having a protective coating layer on the surface indicated that the flux was 2.64 m$^3$/m$^2$.day and the rejection was 99.2%. Even after continuous operation for an additional 24 hours, the membrane showed no decline in the performances. In the test for chlorine resistance, the performance of the membrane did not deteriorate.

EXAMPLE 12

A composite semipermeable membrane having a protective coating layer on the surface was obtained in the same way as in Example 10 except that 0.5% of 1,4,8,11-tetraazacyclotetradecane as compound (B) was used instead of 0.25% of trans-2,5-dimethylpiperazine as compound (B).

The performances of the composite semipermeable membrane having a protective coating layer on the surface were measured, with the result that the flux was 2.58 m$^3$/m$^2$.day and the rejection was 99.1%. Even after operated continuously for an additional 24 hours, the membrane showed no reduction in those performances. In the chlorine resistance test, the membrane did not show deterioration of the chlorine resistance.

EXAMPLES 13 TO 24

Composite semipermeable membranes were prepared by the same procedure as in Example 1 with the use of a porous support (support (I)) obtained by the same step as in Example 1 and with the use of the compounds shown in Table 1 below as compound (A), compound (B) and compound (C). The resulting membranes were measured for performances, with the results shown in Table 1. From the results, it is seen that the composite semipermeable membrane of the present invention maintains a high rejection and yet possesses a high flux.

TABLE 1

| Example No. | Concentration of compound (A) in aqueous solution (%) (Note 1) | Concentration of compound (B) in aqueous solution (%) (Note 1) | Concentration of compound (C) in solution (%) (Note 2) | Flux (m$^3$/m$^2$ · day) | Rejection (%) | Chlorine resistance (Note 3) |
|---|---|---|---|---|---|---|
| 13 | P.E.I. 2.5 | D.M.P. 0.5 | T.D.I. 0.3 | 1.95 | 99.6 | O |
| 14 | P.E.I. 2.5 | T.M.P. 0.8 | I.P.C. 1.0 | 2.30 | 99.0 | O |
| 15 | P.E.I. 2.5 | P.I.P. 0.3 | I.P.C. 0.5 | 2.70 | 98.8 | O |
| 16 | P.E.I. 2.5 | 3-A.M.P. 0.8 | T.D.I. 0.5 | 2.12 | 99.2 | O |
| 17 | P.E.I. 2.0 | 2-A.E.P. 0.3 | I.P.C. 1.0 | 2.41 | 99.1 | O |
| 18 | P.E.I. 1.5 | 4-A.M.P. 0.2 | I.P.C. 0.5 | 2.78 | 98.9 | O |
| 19 | P.E.I. 2.0 | T.A.C.D.D. 1.5 | T.D.I. 0.3 | 2.03 | 99.1 | O |
| 20 | P.E.I. 2.5 | P.A.C.H.D. 0.3 | I.P.C. 1.0 | 2.68 | 99.2 | O |

TABLE 1-continued

| Example No. | Concentration of compound (A) in aqueous solution (%) (Note 1) | Concentration of compound (B) in aqueous solution (%) (Note 1) | | Concentration of compound (C) in solution (%) (Note 2) | | Flux (m³/m² · day) | Rejection (%) | Chlorine resistance (Note 3) |
|---|---|---|---|---|---|---|---|---|
| 21 | P.E.I. 2.0 | D.A.T.A.O.D. | 1.5 | I.P.C. | 1.0 | 2.80 | 99.0 | O |
| 22 | P.E.I. 2.0 | D.M.T.A.C.T.D. | 1.0 | I.P.C. | 0.5 | 2.98 | 98.9 | O |
| 23 | P.P.I. 2.5 | D.M.P. | 0.5 | I.P.C. | 1.0 | 2.42 | 99.1 | O |
| 24 | P.P.I. 2.5 | 4-A.M.P. | 0.3 | I.P.C. | 1.0 | 2.32 | 99.0 | O |

(Note 1):
Compound (A) and compound (B) were used as an aqueous solution.
(Note 2):
Compound (C) was used as an n-hexane solution.
(Note 3):
Chlorine resistance was evaluated as follows:
O Did not change.
Δ Slightly deteriorated.
X Deteriorated.

The abbreviations in Table 1 have the following meanings:
P.E.I.: Polyethylenimine
P.P.I.: 1,2-Polypropylenimine
T.D.I.: Tolylene-2,4-diisocyanate
I.P.C.: Isophthaloyl chloride
D.M.P.: trans-2,5-Dimethylpiperazine
T.M.P.: 2,3,5,6-Tetramethylpiperazine
P.I.P.: Piperazine
3-A.M.P.: 3-Aminomethylpiperidine
2-A.E.P.: 2-Aminoethylpiperidine
4-A.M.P.: 4-Aminomethylpiperidine
T.A.C.D.D.: 1,4,7,10-Tetraazacyclododecane
P.A.C.H.D.: 1,4,7,10,13-Pentaazacyclohexadecane
D.A.T.A.O.D.: 1,18-Diamino-4,8,11,15-tetraazaoctadecane
D.M.T.A.C.T.D.: 12,14-Dimethyl-1,4,8,11-tetraazacyclotetradecane

COMPARATIVE EXAMPLES 1 TO 11

For comparisons, a porous support (support (I)) was formed by the same step as in Example 1, and composite membranes were prepared by the same procedure as in Example 1, with the use of the porous support, except that either compound (A) or compound (B) was omitted. Then, the resulting composite membranes were measured for performances. The results are shown in Table 2. Comparison of the data in Table 2 with said data on the composite semipermeable membranes according to the present invention will clarify the superiority of the composite semipermeable membranes of the present invention.

In Table 2, E.D.A. signifies ethylenediamine and M.P.D.A. means meta-phenylenediamine, and the other abbreviations have the same meanings as in Table 1.

TABLE 2

| Comparative Example No. | Concentration of compound (A) in aqueous solution (%) (Note 1) | Concentration of compound (B) in aqueous solution (%) (Note 1) | | Concentration of compound (C) in aqueous solution (%) (Note 2) | | Flux (m³/m² · day) | Rejection (%) | Chlorine resistance (Note 3) |
|---|---|---|---|---|---|---|---|---|
| 1 | P.E.I. 2.5 | — | | I.P.C. | 1.0 | 1.41 | 98.4 | Δ |
| 2 | P.P.I. 2.5 | — | | I.P.C. | 1.0 | 1.54 | 98.0 | Δ |
| 3 | — | D.M.P. | 2.5 | I.P.C. | 1.0 | 1.52 | 64.3 | X |
| 4 | — | 4-A.M.P. | 0.6 | I.P.C. | 0.5 | 0.78 | 70.8 | X |
| 5 | — | 4-A.M.P. | 2.5 | I.P.C. | 1.0 | 0.06 | 83.7 | X |
| 6 | — | 3-A.M.P. | 1.0 | T.D.I. | 0.5 | 0.24 | 60.8 | X |
| 7 | — | T.A.C.D.D. | 2.5 | I.P.C. | 1.0 | 0.92 | 80.3 | X |
| 8 | — | D.A.T.A.O.D. | 2.5 | I.P.C. | 1.0 | 0.23 | 63.0 | X |
| 9 | — | T.A.C.D.D. | 2.5 | T.D.I. | 0.5 | 0.68 | 70.2 | X |
| 10 | P.E.I. 2.5 | E.D.A. | 0.25 | I.P.C. | 1.0 | 0.19 | 62.8 | X |
| 11 | P.E.I. 2.5 | M.P.D.A. | 0.25 | I.P.C. | 1.0 | 0.36 | 80.5 | X |

(Note 1):
Same as in Table 1.
(Note 2):
Same as in Table 1.
(Note 3):
Same as in Table 1.

What is claimed is:

1. A composite semipermeable membrane comprising a porous support and a crosslinked thin film formed on said porous support, said crosslinked thin film being prepared by the process consisting essentially of forming a film consisting essentially of compound (A) and compound (B) on a porous support, contacting said film with a solution of compound (C) and then drying said film to form a crosslinked film, said compound (A), being at least one compound selected from the group consisting of polyalkylenimines and polyalkylenimine derivatives which have been prepared by the process consisting essentially of reacting part of the amino groups of polyalkylenimines with compounds having functional groups reactive with said amino groups of said polyalkylenimines and which have been rendered soluble in water or solvent mixtures comprising mainly water, said compound (B) being at least one compound selected from the group consisting of:
compound (B₁) of the general formula

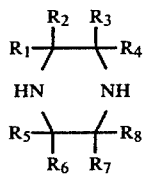

wherein $R_1$ to $R_8$ each represent a hydrogen atom or an alkyl group having 1 to 4 carbon atoms, compound ($B_2$) of the general formula

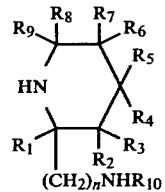

wherein $R_1$ to $R_{10}$ each represent a hydrogen atom, or an alkyl group having 1 to 4 carbon atoms, and n denotes an integer of 1 to 3, compound ($B_3$) of the general formula

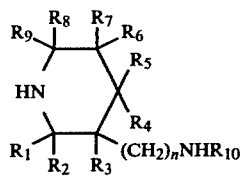

wherein $R_1$ to $R_{10}$ each represent a hydrogen atom or an alkyl group having 1 to 4 carbon atoms, and n denotes an integer of 1 to 3, compound ($B_4$) of the general formula

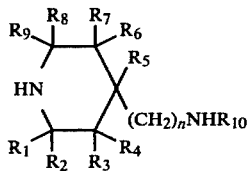

wherein $R_1$ to $R_{10}$ each represent a hydrogen atom or an alkyl group having 1 to 4 carbon atoms, and n denotes an integer of 1 to 3, and
compound ($B_5$) (excluding compound (A)) of the general formula

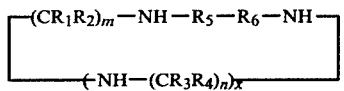

wherein $R_1$ to $R_4$ each represent a hydrogen atom or an alkyl group having 1 to 4 carbon atoms; m and n each represent an integer of 2 or 3; x denotes an integer of 1 to 4; $R_5$ and $R_6$ each represent an alkylene group having 1 to 4 carbon atoms; and $R_5$ and $R_6$ may each represent hydrogen atoms or an alkyl group having 1 to 4 carbon atoms without being bonded to each other, and
said compound (C) being a compound having in one molecule two or more functional groups capable of reacting with amino groups.

2. A composite semipermeable membrane as recited in claim 1, wherein said porous support is polysulfone.

3. A composite semipermeable membrane as recited in claim 1, wherein the proportion of said compound (A) to said compound (B) used is in the range of from 1:0.05 to 1:1 in weight ratio.

4. A composite semipermeable membrane as recited in claim 1, wherein said compound (A) is at least one compound selected from the group consisting of polyethylenimine and an ethylenimine/1,2-propylenimine copolymer.

5. A composite semipermeable membrane as recited in claim 1, wherein said compound (B) is at least one compound selected from the group consisting of piperazine, 2,5-dimethylpiperazine, 4-aminomethylpiperidine, and 1,4,8,11-tetraazacyclotetradecane.

6. A composite semipermeable membrane as recited in claim 1, wherein said compound (C) is at least one compound selected from the group consisting of isophthaloyl chloride, terephthaloyl chloride, and tolylene diisocyanate.

7. A composite semipermeable membrane as recited in claim 1, further including a protective coating layer of a water-soluble organic polymer formed on the surface of said crosslinked thin film.

* * * * *